United States Patent [19]
Polach

[11] Patent Number: 6,098,596
[45] Date of Patent: Aug. 8, 2000

[54] PROCESS FOR OPERATING AN INTERNAL COMBUSTION ENGINE AND A FUEL INJECTION SYSTEM FOR CARRYING OUT THE PROCESS

[75] Inventor: Wilhelm Polach, Moeglingen, Germany

[73] Assignee: Robert Bosch GmbH, Stuttgart, Germany

[21] Appl. No.: 09/163,543

[22] Filed: Sep. 30, 1998

[30] Foreign Application Priority Data

Sep. 30, 1997 [DE] Germany .............. 197 43 061

[51] Int. Cl.⁷ ..................................... F02M 7/00
[52] U.S. Cl. ........................... 123/435; 123/316
[58] Field of Search .................... 123/435, 316

[56] References Cited

U.S. PATENT DOCUMENTS

| | | |
|---|---|---|
| 2,922,436 | 1/1960 | Brash . |
| 4,624,229 | 11/1986 | Matekunas .............. 123/435 |
| 4,721,089 | 1/1988 | Currie et al. ............ 123/435 |
| 4,841,935 | 6/1989 | Yamada et al. .......... 123/435 |
| 5,245,969 | 9/1993 | Nishiyama et al. ...... 123/435 |

FOREIGN PATENT DOCUMENTS

| | | |
|---|---|---|
| 0103064 A2 | 3/1984 | European Pat. Off. . |
| 0785349 A2 | 7/1997 | European Pat. Off. . |
| 0 805266A1 | 11/1997 | European Pat. Off. . |
| 3048928 A1 | 7/1982 | Germany . |

*Primary Examiner*—John Kwon
*Attorney, Agent, or Firm*—Ronald E. Greigg; Edwin E. Greigg

[57] ABSTRACT

A process for operating an internal combustion engine in which in the event of an incorrect fuel injection, the combustion chamber of the engine is discharged toward the injection side by way of a pressure valve in such a way that by introducing burned exhaust gases into the combustion chamber in lieu of fresh atmospheric oxygen, the combustion is interrupted despite or precisely due to an excess of injected fuel present. The resultant impairment of the drive output is used as a signal to trigger an interruption of the fuel supply or to shut off the engine. This prevents a destruction of the engine as a result of a malfunction of the injection.

10 Claims, 1 Drawing Sheet

PROCESS FOR OPERATING AN INTERNAL COMBUSTION ENGINE AND A FUEL INJECTION SYSTEM FOR CARRYING OUT THE PROCESS

BACKGROUND OF THE INVENTION

The invention is based on a process for operating an internal combustion engine and a fuel injection system for carrying out the process. A process of this kind is realized with known fuel injection systems which provide the fuel to be injected in a high pressure fuel reservoir. However, due to the continuously available fuel under high pressure, this brings about the danger that in the event of a failure of the fuel injection valve or its electrical control, the fuel injection valve remains in the open position after a fuel injection so that furthermore, fuel under high pressure is continuously fed into the respective combustion chamber of the engine. This fuel quantity can be abruptly ignited together with the fresh air that is brought in again in the subsequent compression stroke. This leads to a considerable generation of heat connected with an extreme pressure increase, which is not provided for in the normal operation of the engine and consequently can lead to the destruction of the engine.

DESCRIPTION OF THE PREFERRED EMBODIMENTS

By means of the process according to the invention and the fuel injection system for carrying out this process, monitoring the combustion chamber pressure for an excessive pressure with the aid of a pressure valve achieves the fact that in the event of the incorrect behavior of a fuel injection valve, in which a fuel injection quantity is fed in after the desired fuel injection phase and there is a pressure increase due to this excess amount of injected fuel, the combustion products are delivered by the shortest path directly to the combustion chamber on the intake side of the engine. As a result, the intake of fresh air is impaired or sharply reduced so that the combustion chamber is no longer supplied with sufficient atmospheric oxygen to completely burn the excess fuel introduced and to thus produce a sudden combustion that damages the engine at the end of its compression cycle. By means of the return directly to the inlet of the combustion chambers of the engine, the atmospheric oxygen to be aspirated is thus replaced with exhaust and a further combustion is prevented by extinguishing the combustion process.

The immediate return of exhaust to the inlet of the combustion chambers of the engine that is carried out by way of the pressure valve when the combustion chamber pressure is too high is supported in a very significant manner by means of the embodiment set forth herein by virtue of the fact that the exhaust emitted is introduced into the intake system downstream of the air throttle device. In this way, it is assured that as little atmospheric oxygen as possible reaches the combustion chamber when there is damage, which despite the presence of too much fuel can no longer then lead to excessive, damaging of the combustion chamber pressures.

In an advantageous manner, an incorrect combustion proceeding in this manner is detected from the drive work produced by the engine and the engine is then shut off. To that end, the fuel supply to all fuel injection valves can be interrupted or in connection with an exhaust return device that is provided in the engine and has an air throttle device, the engine can be shut off by means of excessive exhaust return. For carrying out the process, a discharge line is provided in which the pressure valve is disposed and which feeds back directly from the combustion chamber to the inlet of the combustion chambers of the engine. In an advantageous manner the electrical control device is connected to a monitoring device which triggers a device for shutting off the engine in the event of incorrect combustion. Accordingly, a device is advantageously activated for interrupting the fuel supply to all fuel injection points. The shutting off of the engine can also be advantageously carried out when there is an exhaust return device and an air throttle device, by means of closing the air throttle device and opening an exhaust return valve in an exhaust return line. For lack of atmospheric oxygen, the engine shuts off quickly.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
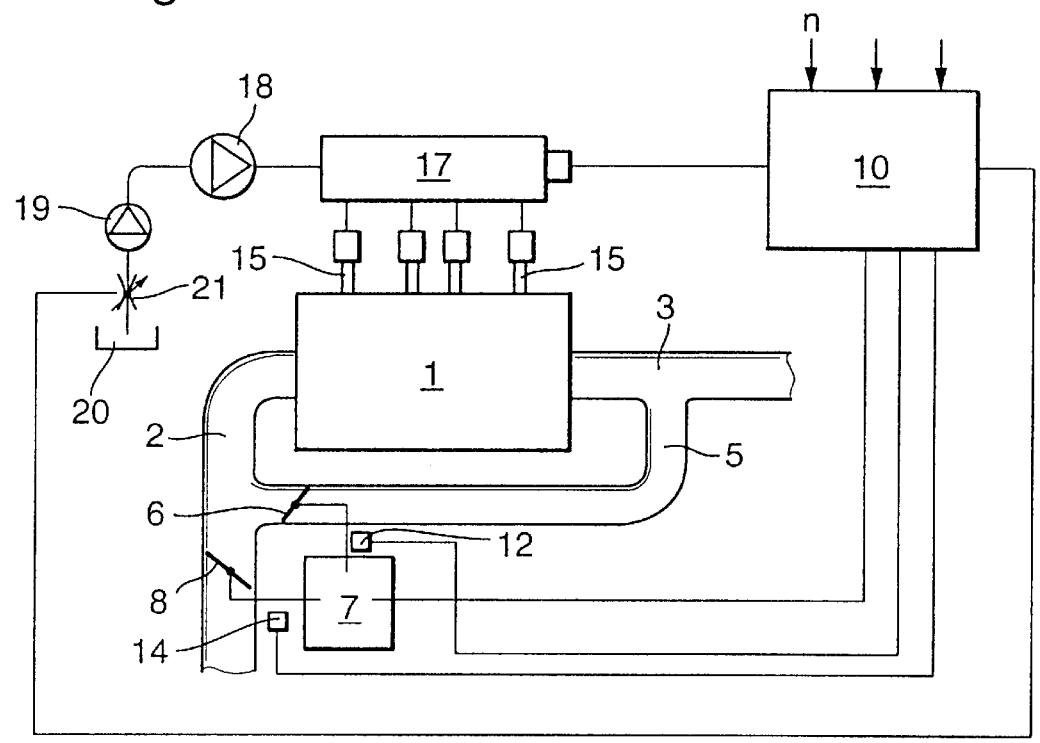
FIG. 1 shows a fuel injection system in which the process according to the invention is realized.

FIG. 1 shows a fuel injection system with an internal combustion engine 1, which is supplied with combustion air by way of an intake system 2 and whose exhaust is carried off by way of an exhaust manifold system 3. In this engine, moreover, an exhaust return is realized in the form of an exhaust return line 5, which leads from the exhaust manifold system 3 to the intake system 2 as close as possible to the outlet of the exhaust from the combustion chamber of the engine and an exhaust return valve 6 is disposed in this return line. The exhaust return line feeds into the intake system downstream of an air throttle device 8. The air throttle device and the exhaust return valve are embodied in the Fig. as throttle valves, but can also be realized in another embodiment. The actuation of the exhaust return valve and the air throttle device is controlled electromechanically in a known manner by an adjusting device 7. This control device is in turn controlled by an electrical control device 10, which detects operating parameters of the engine and which receives the position of the exhaust return valve sent back to it by a first sensor 12 and receives the position of the air throttle device as a control signal from a second sensor 14.

The fuel supply of the engine is carried out by way of fuel injection valves 15, which are likewise electrically controlled and whose opening and closing is likewise triggered by means of the electrical control device 10. The fuel injection valves are associated with combustion chambers of the engine, not shown in detail here, and are supplied with fuel under a constant injection pressure from a high pressure fuel reservoir 17. When the fuel injection valves open, as triggered by means of the control device 10, an injection consequently occurs at the established point in time for a predetermined time span that corresponds to a predetermined fuel injection quantity.

The high pressure fuel reservoir is supplied with fuel by means of a high pressure pump 18 in combination with a prefeed pump 19 which delivers fuel to the high pressure pump from a fuel reservoir 20 in a metered quantity so that just the high pressure fuel quantity that is required for injection is delivered to the high pressure fuel reservoir. To that end, a quantity control mechanism 21 in the inflow to the prefeed pump or to the high pressure pump is controlled by the electrical control device 10. The electrical control device 10 receives information as to the level of fuel pressure prevailing in the high pressure fuel reservoir, which is sent back to the control device by a pressure sensor 22. The high pressure fuel delivery quantity of the high pressure pump 18 is then varied in accordance with the deviation from a set point. In the event of damage, this control of the fuel quantity delivered cannot prevent an excess of fuel injected by a fuel injection valve since only the reservoir pressure is regulated, but not the quantity withdrawn from the reservoir.

Figure 2:
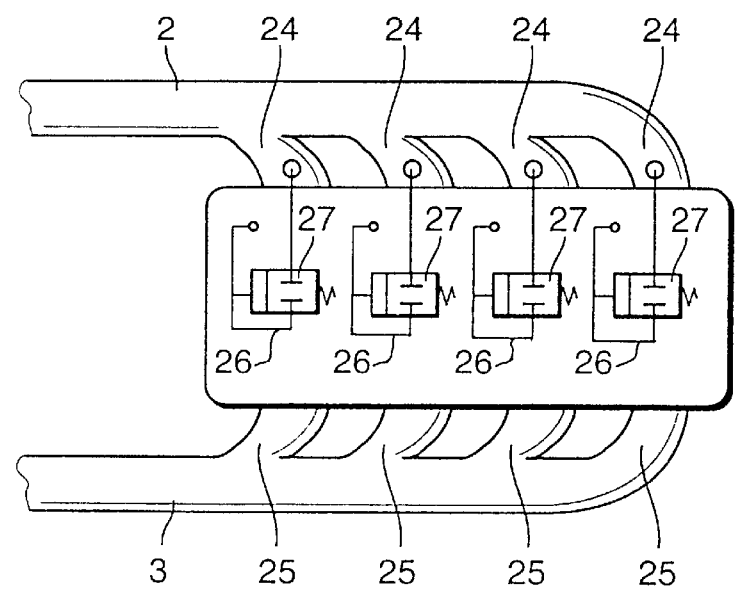
FIG. 2 shows the embodiment for monitoring the combustion chamber pressure.

Another schematic representation of an engine is shown in FIG. 2. The intake system 2 is now depicted with intake manifolds 24 and the exhaust manifold system 3 is likewise depicted with exhaust manifolds 25. One discharge line 26 leading from the cylinder is provided for each cylinder and a pressure valve 27 controlled by the combustion chamber pressure is disposed in each discharge line. The pressure valves are set at a response pressure that is higher than the combustion chamber pressure occurring in the normal operation of the engine, but lower than the combustion chamber pressure that constitutes a destructive danger if the engine is operated for a longer time at this pressure level. If the pressure thus established is exceeded, the pressure valves open and the burning gas in the combustion chamber of the engine can escape by way of the discharge line 26 and be supplied to the intake side of the engine. This has the effect that the oxygen otherwise supplied to the combustion chamber of the engine is replaced with combustion products of the combustion chamber. Consequently, in the event of damage, which results in an excess pressure that triggers the discharge, which pressure is produced by excess fuel being introduced, there is no longer sufficient available oxygen to burn all of the excess fuel that has been introduced. The combustion in the combustion chamber of the engine is consequently extinguished. The branching of the discharge line directly from the combustion chamber encourages this process because the path is short enough that burning exhaust can be supplied back into the intake side and into the combustion chambers again.

As a result, the fuel introduced burns up continuously and thus reduces the oxygen content in the combustion chamber so that toward the end of the compression cycle, no sudden ignition can occur with a high pressure increase. Rather, with a corresponding design of the components, the oxygen content in the combustion chamber can be reduced so that after a compression cycle of the engine, an expansion stroke with a work output of any consequence can no longer be achieved. Due to the reduced oxygen, the combustion in the combustion chamber is throttled or inhibited. Each further intake cycle no longer feeds enough oxygen into the combustion chamber to produce a destructive combustion when there is an excess of injected fuel.

The speed and/or speed fluctuations of the engine are detected by means of the electrical control device, and/or a detection signal is derived from other parameters, which gives information about the correct operation of the engine. If the evaluation device in the electrical control device 10 determines that the normal course of combustion has been impaired, a signal to shut off the engine is emitted by the electrical control device. To that end, an interruption of the fuel supply to all fuel injection valves can on the one hand be triggered in such a way that these electrically controlled fuel injection valves are kept in a closed state. In addition, the high pressure supply of the high pressure fuel pump 18 can also be correspondingly reduced or switched off. If the engine, as shown here, is operated with an exhaust return, then another possibility for shutting the engine down is comprised in that the electrical control device closes the air throttle device 8 by way of the control device 7 and opens the exhaust return valve 6 all the way. As a result, the engine is shut off due to the lack of oxygen.

With the process described and the fuel injection system for carrying out the process, a very reliable measure is obtained for preventing an overheating and a damage to the engine in the event of a failure of the injection quantity control and for establishing criteria based upon which a reliable shutting down of the engine is by and large achieved.

The foregoing relates to preferred exemplary embodiments of the invention, it being understood that other variants and embodiments thereof are possible within the spirit and scope of the invention, the latter being defined by the appended claims.

I claim:

1. A process for operating an internal combustion engine, which comprises introducing air by an intake system of the engine into combustion chambers of the engine during an intake cycle, compressing the introduced air in the combustion chamber during a compression cycle, injecting fuel at a high pressure into the combustion chamber and igniting the introduced fuel with the compressed air by means of self-ignition, expanding the ignited fuel-air during an expansion cycle, and expelling the combustion products in an expulsion cycle of the engine, controlling fuel during injection by an electrical control device that controls fuel injection valves which are associated with a combustion chamber of the engine and which are supplied with fuel brought to a high pressure from a high pressure fuel reservoir during said injection, constantly monitoring the combustion chamber pressure by means of a pressure valve and conducting the gasses of the combustion chamber of the engine via the pressure valves into the intake system at a time that a highest permissible pressure is exceeded.

2. The process according to claim 1, which comprises providing the engine with an exhaust return device with an air throttle device disposed downstream of the air throttle valve, and an exhaust return feed into the intake system provided with an exhaust return valve, which comprises monitoring the exhaust return feed into the intake system and the exhaust return valve in their function by the electrical control device, and conducting any gasses leaving the combustion chamber by way of the pressure valve into the intake system downstream of the air throttle device.

3. The process according to claim 2, which comprises connecting the electrical control device to the combustion chamber to monitor for an incorrect combustion detected from a drive workload and in an event of an incorrect combustion, shutting the engine off.

4. The process according to claim 3, which comprises interrupting the fuel supply to all fuel injection valves in order to shut off the engine.

5. The process according to claim 3, which comprises operating the control device to set an order to shut off the engine, the control device sets the exhaust return to a maximal quantity and the air supply to a minimal quantity in the event of an incorrect combustion in order to shut off the engine.

6. A fuel injection system for internal combustion engines that operate with self-ignition, comprising an intake system (2, 24) that is connected to combustion chambers of the engine, said engine including gas exchange valves by way of which an intake cycle, a compression cycle, an expansion cycle, and an expulsion cycle are controlled one after the other, fuel injection valves (15) for fuel injection at a high pressure into the combustion chambers of the engine, an exhaust manifold system (3, 25), into which the combustion products, controlled by the gas exchange valves, are expelled, an electrical control device (10) by means of which the fuel injection valves are controlled, fuel pump means for supplying said fuel injection valves with fuel brought to high pressure from a high pressure fuel reservoir (17) and are each associated with a combustion chamber of the engine, a pressure valve (27) is connected with each combustion chamber of the engine, said pressure valve (27) is connected directly to the intake system (24) by way of a discharge line (26) for constantly monitoring the combustion chamber pressure, and when the pressure of the gasses in the combustion chamber exceeds the high pressure set at the pressure valve (27), said pressure valve (27) is opened.

7. The fuel injection system according to claim 6, in which the engine is provided with an exhaust return means that includes an air throttle device (8) downstream of an exhaust return valve in an exhaust return line (5) which feeds into the intake system (2, 24), and a device which is connected to the control device (10) for monitoring a function of the exhaust return device, and then discharge line (26) feeds into the intake system (2, 24) downstream of the air throttle device (8).

8. The fuel injection system according to claim 7, in which the electrical control device (10) is connected to a monitoring device that can detect an incorrect combustion from the drive work of the engine and in the event of an incorrect combustion, the engine is controlled by a device for shutting the engine off.

9. The fuel injection system according to claim 8, in which the device for shutting the engine off is a device for interrupting the fuel supply to all fuel injection valves (15).

10. The fuel injection system according to claim 8, in which in the event of an incorrect combustion, the control device opens the exhaust return valve (6) completely and closes the air throttle device (8) all the way in order to shut off the engine.

* * * * *